Patented July 24, 1951

2,561,695

UNITED STATES PATENT OFFICE 2,561,695

REMOVAL OF COLOR FROM ALKALINE SOLUTIONS

Hilding B. Gustafson, Hinsdale, Ill., assignor to Infilco Incorporated, Chicago, Ill., a corporation of Delaware No Drawing. Application January 30, 1948, Serial No. 5,488

8 Claims. (Cl. 127—46)

This invention relates to a process for the removal of color from alkaline solution by contacting that solution with an anion exchange material.

A primary object of the present invention is to provide a new and improved process for removing color from alkaline waters or solutions, such as, for example, syrup or sugar solutions.

For several years it has been known that the demineralizing or de-ashing of aqueous solutions by the use of ion exchangers also removed color from the solution. Such processes customarily involve, first, treating the solution to be demineralized with a cation exchanger which substitutes H+ ions for the metallic constituents of the salt in solution, the exhausted cation exchanger being regenerated with acid, and therefore spoken of as operating on the hydrogen cycle. Substitution of H+ ions for the metallic ions of the salt forms the corresponding acids, which are then removed by treatment with an anion exchanger, which is regenerated with caustic soda or other strongly alkaline material and is therefore said to be operating on the hydroxyl cycle. Authorities are not entirely in agreement as to whether the anion exchange treatment is true ion exchange in which hydroxyl ions are substituted for the negative ion of the acids formed by the cation exchange treatment (that is substitution of hydroxyl ion for sulphate, chloride, nitrate, etc., ions) or whether it is an adsorption phenomenon in which the whole acid molecule is adsorbed. It is known that such ion exchange treatment, or "demineralizing" or "de-ashing" as it is often called, results in the removal of a considerable amount of color from the solution being treated—in fact, in some instances, as in the treatment of beet sugar juices, the conversion of a very black liquor into one that may be water white. This color removal takes place in part in the cation exchange treatment and in part in the anion exchanger. However, it has been assumed by those skilled in the art that color removal by the anion exchangers occurred because the solution was acidic in nature—often having a pH of as low as 1.5 and nearly always below about 5.0. As the result of such belief anion exchangers were used only in connection with acid removal, and those working in the art never conceived of using such exchangers apart from an acid medium. From these and other aspects of the demineralizing treatment of solutions, it was believed that color removal by the anion exchanger took place only in connection with the removal of the acid, and was believed to be one aspect of acid removal.

In contrast with prior thinking on the subject I have discovered that the commercial anion exchangers are good color removal and refining agents for the treatment of alkaline solutions. This is a surprising result and directly contradictory to the teaching of many skilled in the art. I have treated a number of waters and a number of various kinds of solutions by my process, and have verified the fact that these anion exchangers have large color removal and refining capacity when operating on aqueous solutions that are alkaline to methyl orange, and many times with a pH of 8.5 or above. I have also found that the color removal and refining capacity of these materials is not exhausted by the exhaustion of their capacity to exchange or remove anions. In fact the color removal and refining capacity in such materials may exist for a considerable period after they have become exhausted insofar as their ion exchange capacity is concerned. Obviously, the anion exchange capacity of such materials can be regenerated only when treated with a highly alkaline material such as sodium hydroxide or sodium carbonate. However, I have found that in some cases, the anion exchanger, when used for color removal or refining, can be regenerated by an acid—it being obvious that regeneration with an acid may completely exhaust the material insofar as its acid removal capacity is concerned.

When regenerating such anion exchange material, when used for refining or color removal, and using an alkaline regenerant, it is necessary to regenerate with a stronger or more powerful alkaline solution than that from which color is removed, such as by treating the material with ammonium hydroxide, sodium carbonate, or sodium hydroxide. The strength of such regenerating solution normally will need be no more than that used for regenerating for ion exchange capacity, such as a solution of strength from ½% to 2% for caustic (NaOH) or about 5% for soda ash ($Na_2CO_3$).

I have found that better refining and color removal capacity is secured by a double regeneration consisting of an alkaline regeneration as above described, followed by an acid treatment to convert the exchanger to a hydrochloride or hydrosulphate before refining or removing color from the solution to be treated. I have further found that even where alkaline regeneration (by alkaline regeneration I mean regeneration with a stronger alkaline reagent, such as ammonium hydroxide, sodium carbonate, or sodium hydroxide) is equal to acid regeneration still it is beneficial to periodically regenerate the color removing or refining, capacity by the double regeneration with an alkaline regeneration and then with a weak solution of one of the stronger mineral acids. Double regeneration can be arranged in either sequence—alkaline regeneration first followed by acid regeneration, or acid regeneration preceding alkaline. Presumably the acid regeneration removes contaminating material from the bed which is not removed by the caustic and which in time tends to accumulate sufficiently to impair the efficiency of the bed as a color remover.

As an example of my process I might mention a series of tests for color removal from syrup and molasses, using laboratory percolators having a diameter of 2⅛ inches and a depth of anion exchange resin of 5 inches, and in using various anion exchange resins commercially available in this country.

In the first test the syrup was highly colored, in excess of 50,000 P. P. M. (parts per million). The first test used material A and a litre of the syrup was passed through the bed. Approximately 75% of the color was removed by passing through the bed, leaving a color of about 13,000 P. P. M. The bed had been regenerated with 300 cc. of a sodium hydroxide solution containing 15 grams of NaOH per litre. It was found that repeated runs through the bed with sodium hydroxide regeneration resulted in a gradual diminishing of the color removal capacity of the material, so that it was found advisable to use double regeneration frequently. The double regeneration kept the bed at substantially constant capacity throughout the test. In connection with the test the effluent from the percolator was passed through a second, and fresh, percolator, and in each instance the second passage resulted in a slight additional color removal.

A second test was made with material B on a second syrup which had an original color of 44,000 P. P. M. The exchange material was regenerated with 300 cc. of sodium hydroxide (15 gr. NaOH per litre). After each run the material was regenerated with sodium hydroxide and without the acid regeneration. The color in the effluent after the first run was 15,000 P. P. M., and this gradually increased until the end of the fifth run the color was 23,000 P. P. M. Again, the effluent from the first run was passed through a second percolator. However with this material there was little change in color resulting from the second pass.

A third syrup was tested for color removal which originally had 39,000 P. P. M. color, using material C. The color of one litre of effluent was 17,000 P. P. M. and in a second pass of this litre through a second percolator the color was reduced to 13,000 P. P. M. This treated syrup was then passed through a bed of doubly regenerated material (alkaline regeneration followed by acid regeneration) and the color was reduced to 8,000 P. P. M. With this material it was found advisable to use double regeneration every third run.

Generally in these tests, in all of which highly colored syrups were tested, it was found that a substantial amount of color was removed by the anion exchange resin, regardless of whether it had been regenerated with caustic alone or with a double treatment of caustic and acid. It seems that the color that remained after one pass through the material was not removable to any substantial extent by subsequent passes through the same material. Also it was noted that in most instances most of the color retained by the material was removed therefrom by regeneration with caustic, although a part remained in the bed and could only be removed by an occasional acid treatment.

A number of tests for color removal on natural alkaline water were also run, using the same percolator bed as in the syrup tests, and using the same materials.

In one case a water of low alkalinity had its color reduced from 39 P. P. M. to 13 P. P. M. when passed through an anion exchange bed which had been regenerated with caustic and to 12 P. P. M. when the bed was regenerated with acid.

In another test the raw water had a color of 71 P. P. M., M (methyl orange) alkalinity of 47 P. P. M., and the effluent water had a color of 24 P. P. M. for the first 30 litres, and then the color began to rise.

A third water, having a color of 60 P. P. M. and an M alkalinity of 169 P. P. M., passed through the same bed in the previous example, had its color reduced to below 10 P. P. M. throughout the run.

A fourth sample of water had a color of 175 P.P.M., M alkalinity of 320, and a pH of 8.3. The first 17 litres passing through the bed had a color of about 30 P.P.M. after which the color began slowly to rise until it reached 42 P.P.M. when 50 litres had been passed through the bed. In this particular test, it was found that passing the water through the bed at the rate of 350 cc. per minute gave an effluent with a color of 47 P.P.M. but when the rate was cut to 175 cc. per minute the effluent color was reduced to 30 P.P.M. These results tallied with those of other tests, indicating that the rate of passage through the exchanger bed was important in determining the amount of color which could be removed.

It might be mentioned that in all of the tests for removal of color from water, approximately the same amount of regenerant was used as in the tests for removal of color from syrup. However the amount of water passed through the bed in one pass was much greater as the original color was much less than that of the syrups tested.

Generally speaking, it was found that all of the anion exchange resins have considerable color removal capacity. Also, it was very noticeable that the anion exchange capacity of a resin was no indication of its color removal capacity, some of the very superior resins, as far as anion exchange capacity is concerned, being inferior as color removers. It is also generally true that two stage regeneration (caustic and acid) is superior to the regeneration with caustic alone. At least it was advisable to use the double regeneration rather frequently such as every third or fifth time in order to maintain the capacity at a maximum. Most of these resins are presumed to be polyamine resins of one kind or another, although in one instance it was known that the resin was a guanidine-formaldehyde condensation product.

Manifestly many modifications and variations of the invention herein described may be made by persons skilled in the art without departing from the spirit and scope thereof. Accordingly the appended claims are to be given an interpretation commensurate with the novelty herein described and as broad as may be permitted by the prior art.

I claim:

1. The method of removing color from an alkaline solution which comprises treating the alkaline solution with an anion exchange material and separating the treated alkaline solution from the material with retained color.

2. The method of refining an alkaline sugar solution which comprises treating the alkaline sugar solution with an anion exchange material and separating the treated alkaline solution from the material with retained color.

3. The method of removing color from an alkaline solution which comprises treating the alkaline solution with an anion exchange resin which has been regenerated by treating with a caustic material followed by exhaustion of the ion exchange capacity with a dilute solution of a strong mineral acid.

4. A method of removing color from natural alkaline water comprising treating the natural alkaline water with an anion exchange material and separating the material with retained color from the water.

5. The method of removing color from an alkaline liquid which comprises contacting the liquid with an anion exchange material whose acid removal capacity has been exhausted.

6. The method of removing color from an alkaline liquid which comprises treating an anion exchange material with acid to exhaust its acid removal capacity and then contacting the alkaline liquid with the treated anion exchange material.

7. The method of removing color from an alkaline sugar solution comprising treating said alkaline sugar solution with an anion exchange material regenerated with caustic and a dilute solution of a strong mineral acid.

8. The method of refining a sugar solution comprising treating said sugar solution by contact with an anion exchange material, and continuing said treatment after the acid removal capacity of said anion material has been exhausted until the color removal capacity of said anion exchange material has been exhausted.

HILDING B. GUSTAFSON.

REFERENCES CITED

The following references are of record in the file of this patent:

UNITED STATES PATENTS

| Number | Name | Date |
|---|---|---|
| 2,228,514 | Griessbach | Jan. 14, 1941 |
| 2,301,669 | Richter | Nov. 10, 1942 |
| 2,366,651 | Rawlings | Jan. 2, 1945 |
| 2,388,224 | Behrman | Oct. 30, 1945 |
| 2,451,272 | Blann | Oct. 12, 1948 |

FOREIGN PATENTS

| Number | Country | Date |
|---|---|---|
| 876,930 | France | Oct. 30, 1946 |
| 557,690 | Great Britain | Dec. 1, 1943 |

OTHER REFERENCES

Buck et al.: "Apple Sirup by Ion Exchange Process," Ind. & Eng. Chem., July 1945, pp. 635–638.

Ser. No. 359,575, Smit (A.P.C.), published May 11, 1943.